United States Patent
Cosci et al.

(10) Patent No.: US 7,027,252 B2
(45) Date of Patent: Apr. 11, 2006

(54) SERVO TRACK WRITER CALIBRATION

(75) Inventors: Michael Cosci, San Jose, CA (US); Paul Marion Green, Hollister, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 8 days.

(21) Appl. No.: 10/815,361

(22) Filed: Mar. 31, 2004

(65) Prior Publication Data

US 2005/0219735 A1    Oct. 6, 2005

(51) Int. Cl.
*G11B 21/02*    (2006.01)

(52) U.S. Cl. ............................. 360/75; 360/31

(58) Field of Classification Search ............... 360/25, 360/27, 31, 53, 51, 75; 324/212, 207.24, 324/207.25
See application file for complete search history.

(56) References Cited

U.S. PATENT DOCUMENTS

| | | | |
|---|---|---|---|
| 5,119,248 A | 6/1992 | Bizjak et al. | |
| 5,909,333 A | 6/1999 | Best et al. | |
| 6,115,203 A | 9/2000 | Ho et al. | |
| 6,624,627 B1 * | 9/2003 | Berger | 324/212 |
| 6,658,922 B1 * | 12/2003 | Leigh et al. | 73/105 |
| 2002/0089779 A1 | 7/2002 | Heydt et al. | |
| 2002/0141309 A1 | 10/2002 | Kadlec et al. | |
| 2002/0145817 A1 | 10/2002 | Szita et al. | |
| 2002/0176199 A1 | 11/2002 | Gomez et al. | |
| 2004/0001277 A1 | 1/2004 | Chliwnyj et al. | |
| 2004/0125491 A1 | 7/2004 | Iseri et al. | |

OTHER PUBLICATIONS

Candela Instruments webstie; disk products and application information about the OSA 5120.(http://www.candela-inst.com) May 20, 2005.*

Toho Technology Corporation; News about the product line of Candela Instruments. (http://216.239.39.104/translate_c?hl=en&sl=ja&u=http://www.toho-tec.co.jp/new/candela.html) May 20, 2005.*

Owens Design Uses CTC Control Platform to Rapidily Devlop Instruments Automation System; Information about the Candela OSA 5120. May 20, 2005.*

* cited by examiner

*Primary Examiner*—David Hudspeth
*Assistant Examiner*—Jason Olson
(74) *Attorney, Agent, or Firm*—G. Marlin Knight

(57) ABSTRACT

The method of the invention for servo track writer calibration consists of writing magnetic servo tracks and performing optical analysis using Kerr effect microscopy. After the servo tracks are written on the disk, the disk is placed in the optical inspection device having Kerr effect microscopy capability which allows the operator to directly observe the location of "track zero" which is conventionally the track nearest to the inner diameter (ID) of the disk. An embodiment of the method comprising measuring a plurality of distances from a selected points on the track zero to obtain an average measurement indicative of a position of track zero on the magnetic disk. The measured data is then used to calibrate or adjust the servo writer.

5 Claims, 1 Drawing Sheet

SERVO TRACK WRITER CALIBRATION

FIELD OF THE INVENTION

The invention relates to the field of manufacturing methods for magnetic data storage devices (disk drives) and more particularly to methods for analyzing the positional accuracy servo tracks on the disk and calibrating the servo track writer.

BACKGROUND OF THE INVENTION

In a typical prior art head and disk system a magnetic transducer is supported by the suspension as it flies above the disk. The magnetic transducer, usually called a "head" or "slider" is composed of elements that perform the task of writing magnetic transitions (the write head ) and reading the magnetic transitions (the read head). The disk has a set of thin films that include a ferromagnetic material in which the magnetic transitions are recorded. The disk is attached to a spindle that is driven by a spindle motor to rotate the disk under the slider which is supported on an actuator that positions the slider over selected points as the disk rotates under the slider. During the manufacturing process permanent servo information is written in the magnetic material to allow the disk drive control system to determine which track the slider is over, a relative position inside the track and index information on the rotational position of the disk. The accuracy of the placement of the servo information is one of the limiting factors in the density of data which can be written and retrieved by the disk drive.

In U.S. Pat. No. 5,119,248 to Bizjak, et al., a servo disk having calibration tracks is described. First and second servo lines are written on opposite sides of the disk is utilized. Separate servo heads are disposed on each side of the disk. It is necessary to know the exact relationship between the intersection of first and second servo heads and the distance to the center of each data head. Ideally the servo heads will detect their respective servo lines simultaneously at a servo line intersection. However, if there is offset introduced between the heads, such simultaneous detection will not occur. The calibration track has a nominal center at a known set of servo line intersections. The calibration track, in one embodiment, utilizes an amplitude comparison scheme to position the data heads. When a data head is positioned over its calibration track, any variation in the spacing of the center of that data head to the intersection of the two servo heads will be indicated by a time difference in the occurrence of detection in the first and second servo lines respectively.

The conventional method for Servo Track Write calibration and tester to tester variance measurements is to write magnetic servo tracks and send the disk to the lab for chemical ferro-fluid application and microscope inspection indexing to measure track zero position. Some of the problems with this method are that it is slow (about 30 minutes per disk), it requires chemicals, and it has low resolution of 0.1 mm (approximately 100 tracks).

SUMMARY OF THE INVENTION

The method of the invention for servo track writer calibration consists of writing magnetic servo tracks and performing optical analysis using Kerr effect microscopy. After the servo tracks are written on the disk, the disk is placed in the optical inspection device having Kerr effect microscopy capability which allows the operator to directly observe the location of "track zero" which is conventionally the track nearest to the inner diameter (ID) of the disk. The distance from a known reference point such as the center the disk can then be measured directly. The method of the invention is much faster and cleaner than the prior art method of ferro-fluid decoration. An embodiment of the method of manufacturing a magnetic disk for use on a magnetic storage device comprises writing a set of servo tracks on the magnetic disk including a track zero, placing the disk on a hub for spinning the disk, spinning the disk at a selected rate, observing the track zero on the magnetic disk using Kerr effect microscopy device, and measuring a first distance from a predetermined point to a first selected point on the track zero. Preferably additional points 90, 180 and 270 degrees around the disk from the first selected point are also measured and averaged together to obtain a single measurement indicative of a position of track zero on the magnetic disk. The measured data on the position of track zero actually written by the particular servo writer is then used to calibrate or adjust the servo writer.

DETAILED DESCRIPTION OF THE INVENTION AND THE PREFERRED EMBODIMENTS

Figure 1:
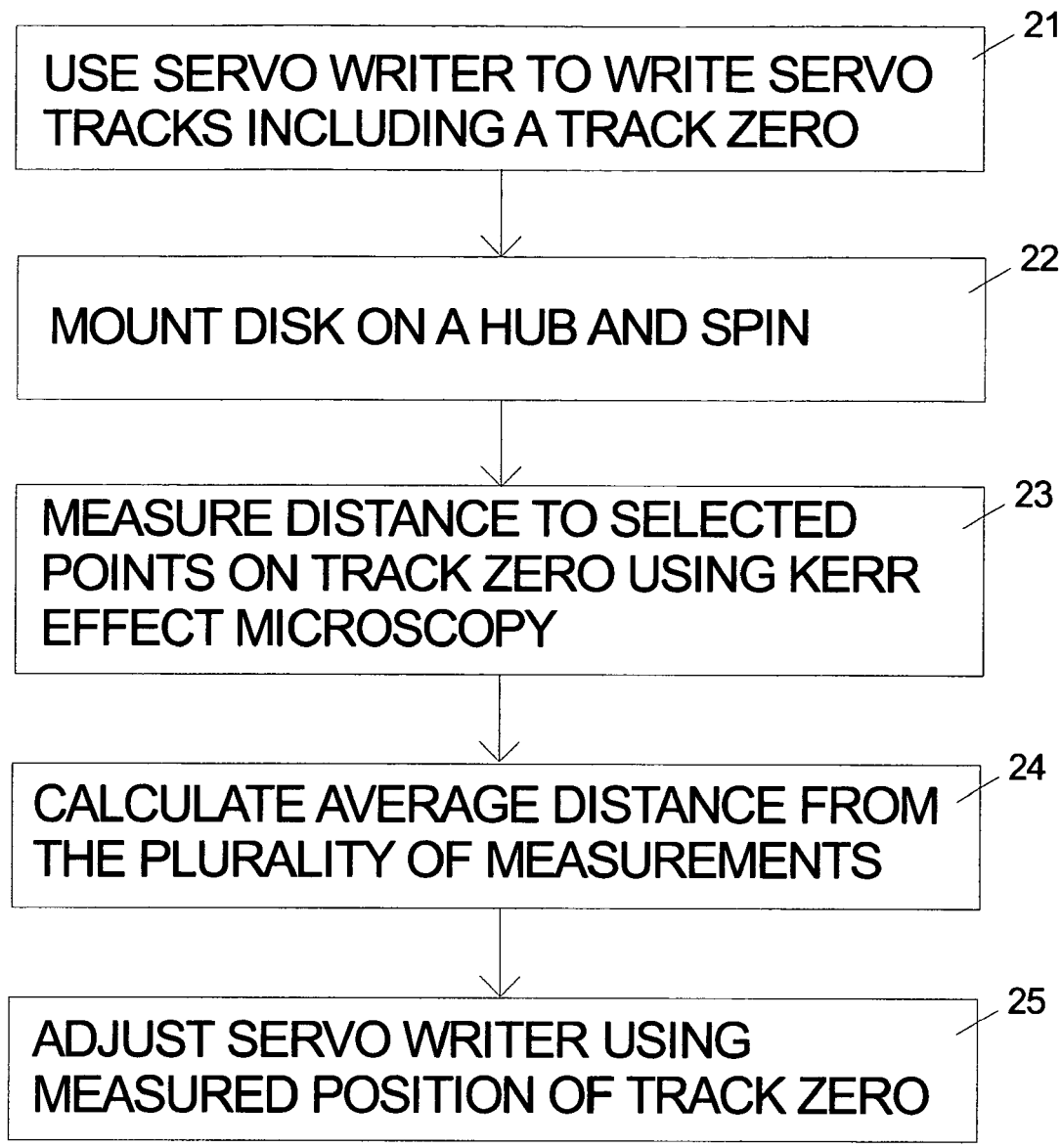
FIG. 1 is a flow chart illustrating an embodiment of the method of the invention.

Disclosed is a method for improved hard disk drive (HDD) Servo Track Writer calibration analysis. This method has been demonstrated to improve HDD Servo Track Write calibration accuracy for Servo Track Writers (STW). This data is very useful to the designers of servo track writing equipment and to the manufacturing personnel who must maintain the servo track writers on a continuous basis.

Reference is made to FIG. 1 which is flow chart illustrating an embodiment of the method according to the invention. The method of the invention for servo track writer calibration includes writing magnetic servo tracks and performing direct optical analysis using Kerr effect microscopy. No ferro-fluid decoration is needed. First the servo tracks are written on the disk 21 by the servo writer. The disk is placed on a spinning hub 22 in the optical inspection device having Kerr effect microscopy capability which allows the operator to directly observe the location of "track zero" which is conventionally the track nearest to the inner diameter (ID) of the disk. The distance from a known reference point such as the center the disk can then be measured directly 23. The method of the invention is much faster and cleaner than the prior art method of ferro-fluid decoration.

One commercially available device that is useful for inspection of disks for use in magnetic disk drives is the OSA 5120 made by Candela Instruments. The 5120 Candela has sufficient resolution to image magnetic written tracks which are approximately 0.001 mm wide. As the disk is spinning at 10,000 rpm position indexing can be made by positioning the index position arrow on Track Zero for accurate measurements. In applicants' tests multiple disks from multiple servo write testers have been measured in only 5 minutes per disk as compared to the prior art of approximately 30 minutes per disk and with very high resolution of 0.001 mm which is approximately 1 track on the disks being tested.

In a preferred embodiment of the method of the invention a prior art standard reference disk is run to ensure the Kerr effect microscopy accuracy. The procedure continues when the tool measurements fall within the expected parameters. The workpiece disk from STW tester is placed into the Kerr effect microscopy tool and loaded onto the hub which spins the disk. As the disk is spinning at 10,000 rpm position indexing can be made by positioning the index position arrow on Track Zero for accurate measurements. The disk is then scanned using the Kerr effect microscopy. In a preferred embodiment of the method using the Candela 5120 the "q-phase" mode of operation is selected to show an image of the written magnetic tracks on the display. Once completed, the track zero location is measured by placing the cursor on track zero, magnifying the area, and recording the digital reading of the radius (i.e. 35.557 mm). Preferably a total of four locations are measured along the track zero radius— each at 90 degrees apart 23. The four measurements are then averaged together and the overall range is also documented 24. The collected data is then available to use to adjust or correct the servo track writer 25.

The invention claimed is:

1. A method of manufacturing a magnetic disk for use on a magnetic storage device comprising:
    writing a set of servo tracks on the magnetic disk using a servo writer, the set of servo tracks including a track zero;
    placing the magnetic disk including the track zero on a hub for spinning the magnetic disk;
    spinning the magnetic disk at a selected rate;
    observing the track zero on the magnetic disk using a Kerr effect microscopy device;
    measuring first and second distances from a predetermined point to first and second selected points on the track zero; and
    adjusting calibration of the servo writer using the first and second distances.

2. The method of claim 1 wherein the second selected point on the track zero is 180 degrees around the disk from the first selected point.

3. The method of claim 2 further comprising the step of measuring a third distance from a predetermined point to a third selected point on the track zero where the third selected point is 90 degrees around the disk from the first selected point.

4. The method of claim of claim 1 further comprising the step of measuring third and fourth distance from a predetermined point to a third and fourth selected points on the track zero where the selected second point is 90 degrees around the disk from the first selected point, the third selected point is 180 degrees around the disk from the first selected point and the fourth selected point is 270 degrees around the disk from the first selected point.

5. The method of claim 4 further comprising the step averaging first, second, third and fourth distances to obtain a single measurement indicative of a position of track zero on the magnetic disk.

* * * * *